United States Patent
Donar et al.

(10) Patent No.: US 8,970,233 B2
(45) Date of Patent: Mar. 3, 2015

(54) NONDESTRUCTIVE INSPECTION SYSTEM CONTROLLER WITH DYNAMIC POSITION CORRECTION

(71) Applicant: Spirit AeroSystems, Inc., Wichita, KS (US)

(72) Inventors: Adam Joseph Donar, Wichita, KS (US); W. Robert Nelson, Wichita, KS (US); Gregorio Balandran, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 326 days.

(21) Appl. No.: 13/674,605

(22) Filed: Nov. 12, 2012

(65) Prior Publication Data

US 2014/0135983 A1    May 15, 2014

(51) Int. Cl.
*G01R 31/00* (2006.01)
*G01N 29/04* (2006.01)
*B25J 9/16* (2006.01)
*G01C 25/00* (2006.01)
*G06F 15/00* (2006.01)

(52) U.S. Cl.
CPC ............... *B25J 9/1653* (2013.01); *G01C 25/00* (2013.01); *G06F 15/00* (2013.01); *Y10S 901/09* (2013.01); *G05B 2219/37206* (2013.01); *G05B 2219/37269* (2013.01); *G05B 2219/45066* (2013.01)
USPC ............... 324/750.02; 324/754.21; 73/619; 901/9

(58) Field of Classification Search
None
See application file for complete search history.

(56) References Cited

U.S. PATENT DOCUMENTS

| 7,448,271 B2 | 11/2008 | Duncan et al. | |
| 8,833,169 B2 * | 9/2014 | Lute et al. | 73/619 |
| 2011/0000299 A1 * | 1/2011 | Isobe et al. | 73/625 |

* cited by examiner

*Primary Examiner* — Minh N Tang
(74) *Attorney, Agent, or Firm* — Hovey Williams LLP

(57) ABSTRACT

A controller for use with a nondestructive inspection system communicates with the nondestructive inspection system and with a robot for moving an inspection probe of the nondestructive inspection system relative to an object under inspection. The controller is configured to periodically generate estimated position information of the probe moving relative to the object under inspection and communicate the estimated position information to the nondestructive inspection system as the nondestructive inspection system collects inspection data from the probe. The controller receives actual position information from the robot, the actual position information indicating an actual position of the probe, and corrects the estimated position information based on the actual position information.

22 Claims, 4 Drawing Sheets

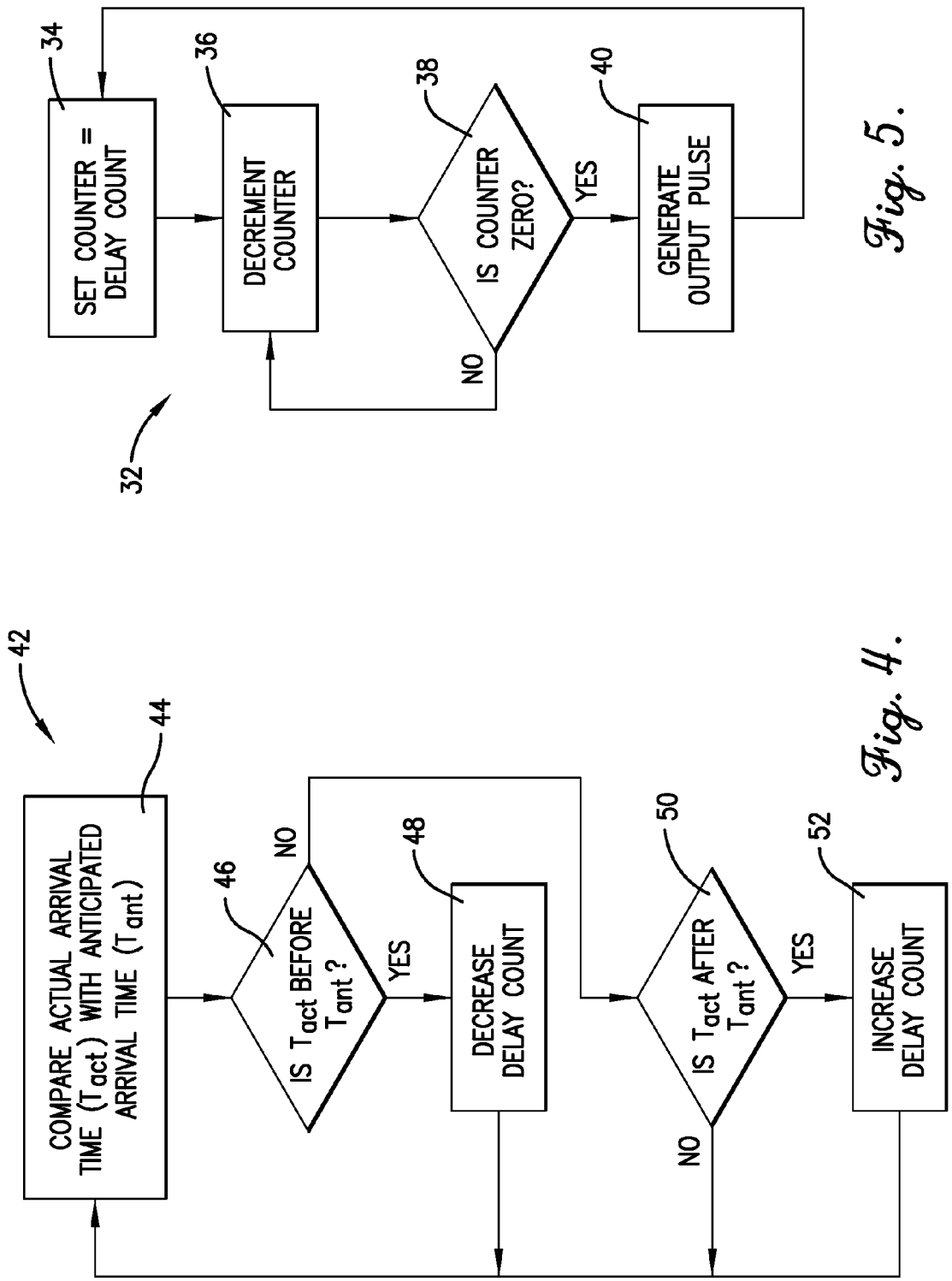

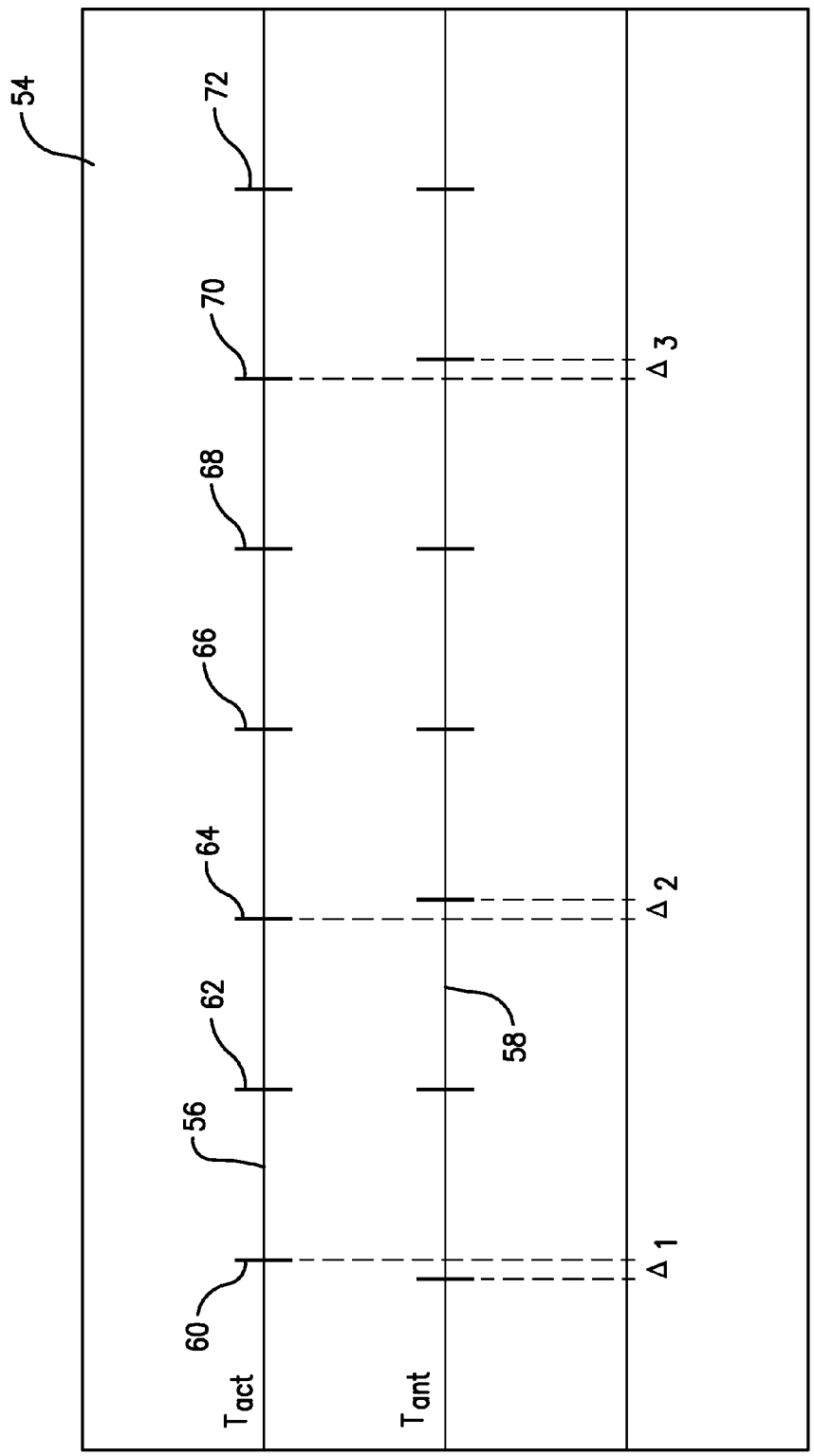

NONDESTRUCTIVE INSPECTION SYSTEM CONTROLLER WITH DYNAMIC POSITION CORRECTION

BACKGROUND

1. Field

Embodiments of the present invention relate to systems and methods for performing nondestructive inspection. More particularly, embodiments of the present invention relate to automated systems and methods of performing nondestructive inspection of objects using a robot to move an inspection probe relative to the object under inspection.

2. Related Art

It is often desirable or required by law to perform a complete inspection of manufactured parts prior to shipment or use. Aircraft composite parts, for example, often require 100% inspection after manufacture to discover any defects such as excessive porosity, delamination, defective bonding, voids, and embedded foreign objects.

Nondestructive inspection is a commonly used method of performing a complete test of manufactured parts. Ultrasonic inspection is one form of nondestructive inspection that involves the use of ultrasound waves to inspect the interior portions of parts. Ultrasonic testing and other forms of nondestructive inspection are desirable in that they can be performed relatively quickly and do not require disassembly of the inspected parts.

Ultrasonic inspection equipment typically utilizes an ultrasound transducer or array of transducers (either of which may be referred to as a "probe") to generate ultrasonic waves. Ultrasonic waves are similar to sound waves but have a much higher frequency, typically well beyond the range of human hearing. During ultrasonic inspection, the ultrasound probe is positioned near the surface of the part being inspected and oriented such that ultrasound waves generated by the probe are directed toward and through the part. When an ultrasound wave encounters a discontinuity in the part, such as a void, delamination or foreign object, part of the energy in the ultrasound wave is reflected. The reflected energy travels back through the part as a second ultrasound wave and is detected by the ultrasound probe, which acts as both a transmitter and receiver in what is commonly referred to as a "pulse echo" ultrasonic test system. The reflected ultrasound waves are collected and used to create a reflection signature, which may be expressed to the user in the form of an image or graph.

Ultrasonic inspection of large objects requires a person to manually move an ultrasound probe along the object under inspection as the inspection system emits ultrasound waves and collects inspection data. Such manual operation of the inspection system requires a person to monitor a sensor display to identify any defects in the structure. Alternatively, mechanical resolvers or encoders may be used to track the location of the transducer during the inspection process. Such mechanical resolvers may include friction-drive wheels that engage the part and roll along the part and sense movement of the transducer by generating signals indicative of movement of the wheels. The resolver (or encoder) generates a signal that the inspection system uses to associate the inspection data received from the probe with a location of the object under inspection. Using a resolver or encoder, the inspection system may generate and store an electronic image of the inspected part, obviating the need for a user to constantly monitor a sensor display during the inspection process.

It is sometimes desirable to further automate the process by using a robot to move the inspection probe relative to the part under inspection. When a robot is used in this manner the same challenges are present, namely, the position of the probe must be tracked with a resolver or encoder or a user must watch a display to identify any defects in the structure under inspection. While most robots are operable to periodically communicate position information, robots do not generate position information frequently enough for use with the inspection system. While a resolver or encoder addresses that problem by generating position information at a frequency that is compatible with the inspection system, the use of a resolver or encoder with a robot introduces additional challenges. The robot would need to be specially programmed or configured, for example, to keep the wheels in contact with the part under inspection. This introduces the possibility of errors and limits the speed at which the robot may be operated, thus mitigating some of the advantages of automation.

SUMMARY

Embodiments of the present invention solve the above-described problems by providing an automated nondestructive inspection system that includes a robot for moving an inspection probe and a controller for estimating a position of the probe. The controller communicates estimated position information to the nondestructive inspection system and uses actual position information from the robot to correct the estimated position information.

A controller in accordance with an embodiment of the invention is configured for use with a nondestructive inspection system. The controller comprises a processor configured to periodically generate estimated position information of a nondestructive inspection probe moving relative to an object under inspection and to communicate the estimated position information to the nondestructive inspection system as the nondestructive inspection system collects inspection data from the probe. The controller receives actual position information, the actual position information indicating an actual position of the probe, and corrects the estimated position information based on the actual position information.

A method of managing a nondestructive inspection system in accordance with another embodiment of the invention comprises periodically generating estimated position information of a nondestructive inspection probe moving relative to an object under inspection and communicating the estimated position information to the nondestructive inspection system as the nondestructive inspection system collects inspection data from the probe. Actual position information indicating an actual position of the probe is received, and the estimated position information is corrected based on the actual position information.

A system in accordance with yet another embodiment of the invention comprises a controller, a nondestructive inspection system including a probe, and a robot for moving the probe relative to an object under inspection, the robot including a communications interface. The controller is configured to receive programming information including instructions for moving the robot according to a part inspection plan and communicate the programming information to the robot via the communications interface. The controller is further configured to periodically generate an estimated position of the probe using the programming information and communicate the estimated position to the nondestructive inspection system as the nondestructive inspection system collects inspection data via the probe, wherein the estimated position information corresponding to a location of the collected inspection data. The controller periodically receives actual position information from the robot, the actual position information indicating an actual position of the probe, and corrects the estimated position information based on the actual position information.

A computer program for managing a nondestructive inspection system in accordance with yet another embodiment of the invention comprises computer instructions for periodically generating estimated position information of a nondestructive inspection probe moving relative to an object under inspection, communicating the estimated position information to the nondestructive inspection system as the nondestructive inspection system collects inspection data from the probe, receiving actual position information, the actual position information indicating an actual position of the probe, and correcting the estimated position information based on the actual position information.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

FIG. 4 is a flow diagram illustrating certain steps performed by the controller of FIG. 1 in a process of correcting estimated position information communicated to the nondestructive inspection system;

FIG. 5 is a flow diagram illustrating certain steps performed by the controller of FIG. 1 in a process of generating the estimated position information of FIG. 4 as a plurality of output pulses; and FIG. 6 is an exemplary timeline illustrating actual operational events of the robot versus estimated times of the events generated by the controller of FIG. 1.

Figure 1:
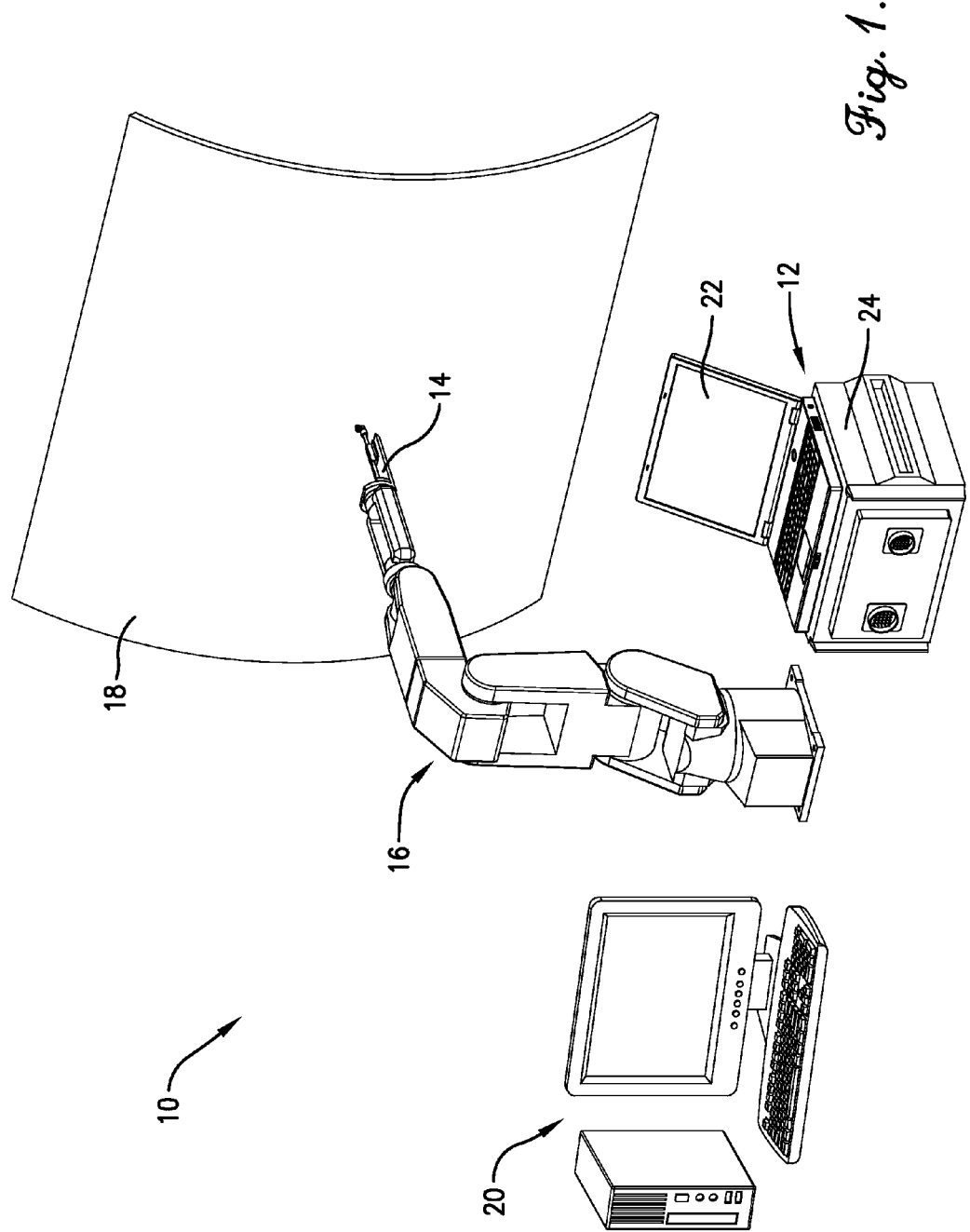
FIG. 1 is a perspective view of an automated inspection system constructed in accordance with embodiments of the invention, shown inspecting an aircraft fuselage section.
Figure 2:
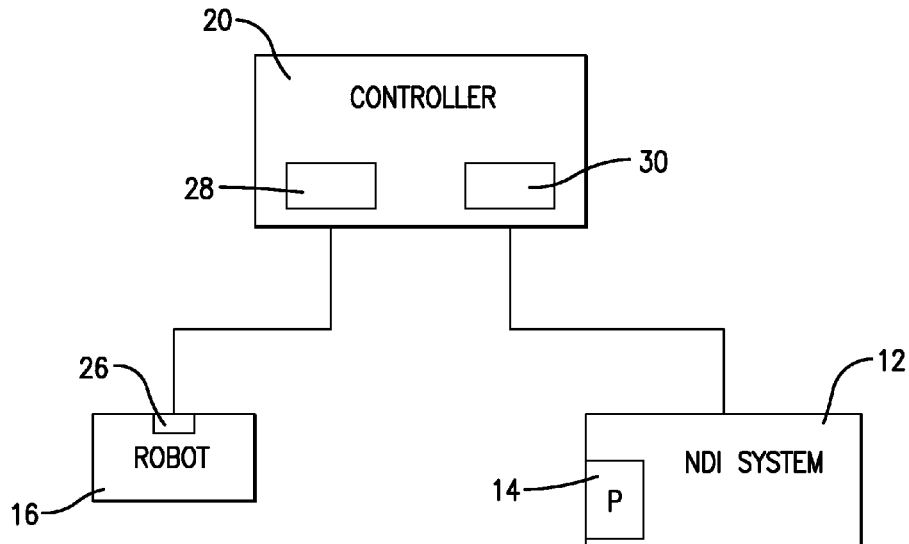
FIG. 2 is a first block diagram of selected components of the system of FIG. 1 including the robot, the controller and the nondestructive inspection system.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Referring now to the drawings, wherein like reference numerals designate identical or corresponding parts throughout the several views, an automated system 10 constructed in accordance with embodiments of the invention is illustrated in FIG. 1. The automated system 10 broadly includes a nondestructive inspection system ("NDI system") 12 including an inspection probe 14, a robot 16 for moving the probe 14 relative to a part under inspection 18, and a controller 20 for directing operation of the robot 16 and communicating position information to the NDI system 12. The NDI system 12 may also include one or more displays 22 and one or more computing components 24.

The inspection probe 14 is operable to emit a nondestructive imaging signal into the part under inspection 18 and to detect reflected portions of the imaging signal. The probe 14 communicates imaging signal data to the computing components 24 of the NDI system 12 for processing, storage and/or display. By way of example, the probe 14 may be an ultrasound probe including a single ultrasound transducer or multiple transducers and may include sensors for detecting reflected ultrasound waves. The probe 14 is mounted on the robot 16 and communicates with the computing components 24 via a wired or wireless connection.

The computing components 24 receive the signal data generated by the probe 14, store the data, and generate a visual representation of the inspection data that is presented via the one or more displays 22. The NDI system 12 also receives estimated position information from the controller 20 and uses the estimated position information to correlate the inspection signal data received from the probe 14 with locations on the part under inspection 18 to generate an electronic image visually depicting inspection results. The NDI system 12 may be a conventional nondestructive imaging system such as the MAUS V system, the OLYMPUS OMNISCAN system, or a similar system. The probe 14 may also be a conventional probe manufactured by, for example, GE INSPECTION TECHNOLOGIES.

The robot 16 moves the probe 14 relative to the part under inspection 18 and may periodically generate position information that may be used, for example, to determine a position of the probe 14 relative to the part under inspection 18. In the illustrated embodiment, the robot 16 is or includes a robotic arm comprising various articulating segments interconnected by a plurality of joints each configured to induce movement about one or more axes. The robot 16 includes a tip configured to secure the probe 14, and further includes a communications interface 26 for receiving programming information from the controller 20 and communicating location information to the controller 20, as explained below in greater detail.

The controller 20 generally directs the operation of the robot 16 and communicates estimated robot position information to the NDI system 12. The controller 20 may be a general purpose computer, such as a laptop computer or desktop computer, and executes a computer program 28 that enables the controller 20 to communicate with the robot 16 and with the NDI system 12 and to generate estimated position information, as explained below in greater detail. The computer program 28 comprises one or more ordered listings of executable instructions for implementing logical functions in the controller 20. The computer program 28 can be implemented in hardware, software, firmware, or a combination thereof. In one exemplary embodiment, the computer program 28 is implemented with one or more software modules.

The computer program 28 is stored in or on one or more computer-readable media residing on or accessible by the controller 20. A "computer-readable medium" as used herein can be any non-transitory means that can contain, store, communicate, propagate or transport all or portions of the program 28 for use by or in connection with the controller 20. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The controller 20 stores a robot programming file 30 that it communicates to the robot 16, to the NDI system 12, or both. The robot programming file 30 includes operating instructions for the robot 16 that direct the robot's actions to move the probe 14 relative to the part under inspection 18. The robot programming file 30 is unique to the part under inspection 18 and may include travel direction and travel speed information. By way of example, the robot programming file 30 may include information describing an inspection travel path comprising a plurality of path "legs" or segments, each including a start point, an end point and a speed of travel between the start point and the end point. The information in the programming file 30 may be contained within a text-based file, such as a comma separated value ("CSV") file or similar file. The robot programming file 30 may be conventional in nature and is preferably compatible with various robots and NDI systems from different manufacturers.

The robot 16 may be mounted on a base (not shown) that imparts movement to the robot 16 to further enable the robot 16 to move relative to the part under inspection 18. Alternatively or additionally, the part under inspection 18 may be mounted on a base (not shown) that imparts movement to the part 18. It will be appreciated by those skilled in the art that movement of the probe 16 relative to the part 18 may result from movement of the robot 16, movement of the part 18, or both. The robot 16 may be a conventional, commercially available robot. By way of example, the robot 16 may be a standard multi-axis robot manufactured by MOTOMAN ROBOTICS, FANUC or KUKA.

The computer program 28 enables the controller 20 to generate estimated probe position information and communicate the estimated position information to the NDI system 12. The estimated position information may be a series of electric output pulses indicating the progress of the robot 16 through a scan path. By way of example, each of the electric output pulses may represent a particular distance of travel, such as a distance of between 0.010 inches and 0.050 inches. Thus, the output pulses may be generated at a rate of between 20 and 100 pulses per inch of travel.

The controller 20 begins generating the estimated position information when the robot 16 begins executing the programming file 30, and generates the output pulses based, at least in part, on velocity information contained in the programming file 30. It is important that the controller 20 generates the output pulses continuously while the robot 16 is moving, as the NDI system 12 advances position only upon receiving the pulses indicating the probe is advancing.

A flow diagram illustrating an exemplary method 32 of generating estimated position information is presented in FIG. 5. The method 32 generally involves generating a series of electric output pulses at a frequency related to, and indicative of, the speed and progress of the robot 16. First, a counter is loaded with a delay count value, as depicted in block 34. The delay count value determines the delay between consecutive output pulses and may be determined based on such factors as an estimated speed of the robot (using, for example, the robot programming file 30) and the speed of the circuitry enabling the counter. The counter is then decremented (decreased by a value of one), as depicted in block 36, and is tested to see if it is equal to zero, as depicted in block 38. If the counter is zero, a pulse is generated, as depicted in block 40. If the counter is not zero, flow of the method returns to block 36 where the counter is decremented again.

The controller 20 periodically receives actual position information from the robot 16 and uses the actual position information to correct the estimated position information communicated to the NDI system 12. The actual position information from the robot 16 may take the form of a series of electric input pulses similar to the output pulses generated by the controller 20 and representing the estimated position information, except that the input pulses from the robot 16 are generated at a lower frequency. The controller 20 may generate pulses at a frequency that is, for example, between five and five hundred times higher than the frequency of the pulses generated by the robot 16.

The electric input pulses from the robot 16 representing the actual position information may be generated to reflect operational events of the robot 16, including reaching the end of a path segment or covering a predetermined distance along the path. The actual position information may differ from the estimated position information for various reasons, including inaccuracies in the output pulse generating process and unanticipated variations in the performance of the robot 16.

A flow diagram illustrating an exemplary method 42 of correcting the estimated position information is presented in FIG. 4. In the illustrated method 42, the controller 20 corrects the estimated position information by comparing the actual arrival time of an input pulse from the robot 16 with an estimated arrival time of the pulse. The controller 20 first receives an input pulse from the robot 16 and compares the actual arrival time of the pulse with the anticipated arrival time of the pulse, as depicted in block 44. The timing of the input pulse (from the robot 16) may or may not correspond to the timing of an output pulse (generated by the controller 20). If the controller 20 generates the output pulses at a rate that is ten times faster than the rate of the input pulses, for example, the anticipated arrival time may correspond to every tenth output pulse. If the actual arrival time precedes the anticipated arrival time, the delay count used by the counter to determine the length of the delay is decreased, as depicted in blocks 46 and 48. If the actual arrival time is after the anticipated arrival time, the delay count is increased, as depicted in blocks 50 and 52.

The controller 20 preferably makes relatively small adjustments, rather than large adjustment, in the delay count to gradually correct differences between the actual position information and the estimated position information. The small adjustments may be between one percent and five percent of the total delay count, which may result in incrementing or decrementing the delay count value by as little as one. Making gradual adjustments in the estimated position avoids discontinuities in the image generated by the NDI system 12.

A timeline of events 54 illustrating adjustments in the output pulses is depicted in FIG. 6. A first line 56 depicts the arrival time of a series of input pulses representing the actual position information generated by the robot. A second line 58 depicts the anticipated arrival time of each of the input pulses on the first line. Each of the anticipated arrival times may or may not correspond to an output pulse generated by the controller 20, as explained above. The anticipated arrival times are calculated by the controller 20 and reflect an estimated position of the probe 14 as calculated by the controller 20.

In the illustrated timeline 54, the actual arrival time of a first event 60 occurs later than the corresponding estimated arrival time by an amount $\Delta_1$, such that the controller 20 responds by increasing the delay count using the method 42 illustrated in FIG. 4. In response to the first adjustment, the actual arrival time of a second event 62 occurs at the same time as the estimated arrival time of the second event. However, the actual arrival time of a third event 64 precedes the estimated arrival time of the third event by an amount $\Delta_2$, reflecting, for example, overcorrection in response to $\Delta_1$. In response to $\Delta_2$, the controller 20 decreases the delay count using the method 42 illustrated in FIG. 4. The actual arrival time of the fourth 66 and fifth 68 events correspond to the respective anticipated arrival times, while the actual arrival time of the sixth event 70 occurs earlier than the estimated arrival time of the event by an amount $\Delta_1$.

The controller 20 may increase or decrease the delay count in varying amounts depending on the magnitude of the difference between the actual arrival time and the anticipated arrival time of the operational event. The amount of increase or decrease may be graduated, for example, and may be between one percent and five percent of the total delay count, depending on the magnitude of the difference between the actual arrival time and the anticipated arrival time of the operational event.

Figure 3:
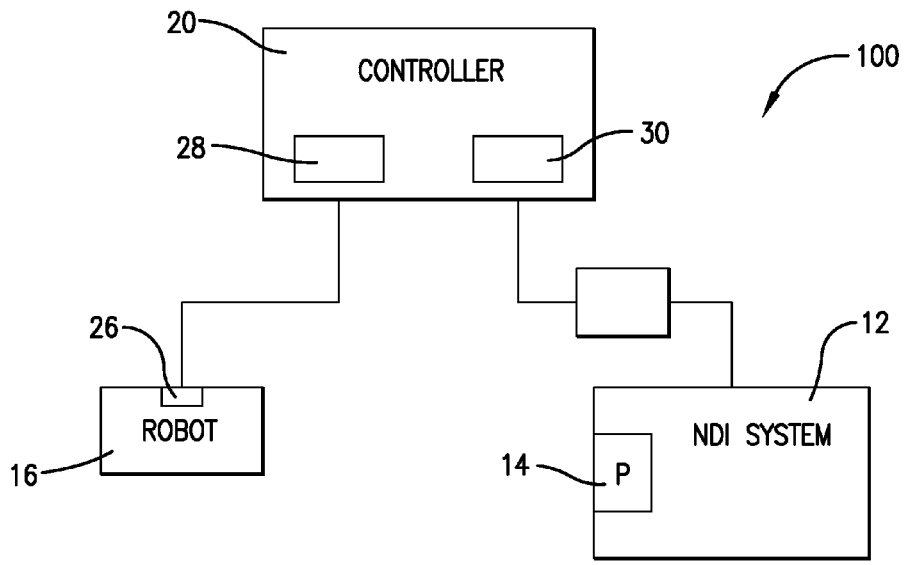
FIG. 3 is a block diagram of selected components of another embodiment of the system of FIG. 1 including the robot, the controller, the nondestructive inspection system and an interface component interposed between the controller and the nondestructive inspection system.

Referring now to FIG. 3, an automated system 100 constructed in accordance with another embodiment of the invention is illustrated. The automated system 100 includes the NDI system 12, the robot 16, and the controller 20 as described above. The system 100 further includes an interface component 102 interposed between the controller 20 and the NDI system 12. The interface component 102 resolves communications compatibility mismatches between the controller 20 and the NDI system 12 by converting signals from the controller 20 to a format that is compatible with the NDI system 12 and converting signals from the NDI system 12 to a format that is compatible with the controller 20.

In some embodiments of the invention, the NDI system 12 may be configured to receive an analog signal, such as a signal generated by a mechanical resolver. If the controller 20 generates a digital signal, it may be necessary for the interface component 102 to convert the digital signal generated by the controller 20 to an analog signal compatible with the NDI system 12.

Although the invention has been described with reference to the exemplary embodiments illustrated in the attached drawings, it is noted that equivalents may be employed and substitutions made herein without departing from the scope of the invention as recited in the claims. For example, while the estimated position information and the actual position information are described herein as a series of electric pulses, it will be appreciated that the position information may take virtually any form and may be analog or digital in nature. Furthermore, the relationship between the input pulses generated by the robot 16 and the output pulses generated by the controller 20 may be uniform, such as where a certain number of output pulses always corresponds to each input pulse, or may be non-uniform, such as where the number of output pulses corresponding to each input pulse fluctuates.

Having thus described various embodiments of the invention, what is claimed as new and desired to be protected by Letters Patent includes the following:

1. A controller for use with a nondestructive inspection system, the controller comprising:
   a processor configured to:
   periodically generate estimated position information of a nondestructive inspection probe moving relative to an object under inspection;
   communicate the estimated position information to the nondestructive inspection system as the nondestructive inspection system collects inspection data from the probe;
   receive actual position information, the actual position information indicating an actual position of the probe; and
   correct the estimated position information based on the actual position information.

2. The controller of claim 1, the processor further configured to generate the estimated position information as a series of electric output pulses.

3. The controller of claim 2, the processor further configured to correct the estimated position information by adjusting a delay between the electric output pulses.

4. The controller of claim 3, the processor further configured to receive the actual position information in the form of periodic electric input pulses, the electric input pulses occurring at a lower frequency than the output pulses.

5. The controller of claim 4, the input pulses occurring at a first frequency and the output pulses occurring at a second frequency, the second frequency being between five and one-hundred times higher than the first frequency.

6. The controller of claim 1, the processor further configured to generate the estimated position information using part-specific program code that includes instructions for operating a robot to move the probe relative to a part under inspection.

7. The controller of claim 6, the part-specific program code including probe velocity information, the processor being configured to generate the estimated position information based at least in part on the velocity information.

8. The controller of claim 6, the processor further configured to communicate the part-specific program code to the robot.

9. The controller of claim 6, the processor further configured to receive the actual position information from the robot.

10. A method of managing a nondestructive inspection system, the method comprising:
   periodically generating estimated position information of a nondestructive inspection probe moving relative to an object under inspection;
   communicating the estimated position information to the nondestructive inspection system as the nondestructive inspection system collects inspection data from the probe;
   receiving actual position information, the actual position information indicating an actual position of the probe; and correcting the estimated position information based on the actual position information.

11. The method of claim 10, further comprising generating the estimated position information as a series of electric output pulses.

12. The method of claim 11, further comprising correcting the estimated position information by adjusting a delay between the electric output pulses.

13. The method of claim 12, further comprising receiving the actual position information in the form of periodic electric input pulses, the electric input pulses occurring at a lower frequency than the output pulses.

14. The method of claim 13, the input pulses occurring at a first frequency and the output pulses occurring at a second frequency, the second frequency being between five and one-hundred times higher than the first frequency.

15. The method of claim 10, further comprising generating the estimated position information using part-specific program code that includes instructions for operating a robot to move the probe relative to a part under inspection.

16. A nondestructive inspection system comprising:
   an inspection probe;
   a robot for moving the probe relative to an object under inspection, the robot including a communications interface; and
   a controller configured to—
      receive programming information including instructions for moving the robot according to a part inspection plan,
      communicate the programming information to the robot via the communications interface,
      periodically generate an estimated position of the probe using the programming information,
      communicate the estimated position to the nondestructive inspection system as the nondestructive inspection system collects inspection data via the probe, the estimated position information corresponding to a location of the collected inspection data,
      periodically receive actual position information from the robot, the actual position information indicating an actual position of the probe, and
      correct the estimated position information based on the actual position information.

17. The system of claim 16, further comprising an electronic interface device configured to—
   receive the estimated position information from the controller in a first format,
   convert the estimated position information from the first format to a second format that is compatible with the nondestructive inspection system, and
   communicate the estimated position information to the nondestructive inspection system in the second format.

18. The system of claim 17, the first format being a digital format and the second format being an analog format.

19. The system of claim 16, the controller further configured to generate the estimated position information as a series of electric output pulses and to correct the estimated position information by adjusting a delay between the electric output pulses.

20. The system of claim 19, the controller further configured to receive the actual position information in the form of periodic electric input pulses, the electric input pulses occurring at a lower frequency than the output pulses.

21. The system of claim 20, the input pulses occurring at a first frequency and the output pulses occurring at a second frequency, the second frequency being between five and one-hundred times greater than the first frequency.

22. A computer program for managing a nondestructive inspection system, the computer program product being embodied in a computer readable medium and comprising computer instructions for:
   periodically generating estimated position information of a nondestructive inspection probe moving relative to an object under inspection;
   communicating the estimated position information to the nondestructive inspection system as the nondestructive inspection system collects inspection data from the probe;
   receiving actual position information, the actual position information indicating an actual position of the probe; and
   correcting the estimated position information based on the actual position information.

* * * * *